(No Model.)

G. W. GREIG.
MACHINE FOR MIXING DOUGH.

No. 507,360. Patented Oct. 24, 1893.

Witnesses.  Inventor.
Thos. F. Sheridan  George W. Greig
Samuel E. Hibben  By Banning & Banning & Payson
 Attorneys.

UNITED STATES PATENT OFFICE.

GEORGE W. GREIG, OF CHICAGO, ILLINOIS.

MACHINE FOR MIXING DOUGH.

SPECIFICATION forming part of Letters Patent No. 507,360, dated October 24, 1893.

Application filed February 21, 1893. Serial No. 463,185. (No model.)

*To all whom it may concern:*

Be it known that I, GEORGE W. GREIG, of Chicago, Illinois, have invented certain new and useful Improvements in Machines for Mixing Dough, of which the following is a specification.

The object of my invention is to make a machine of such construction that bread or cake dough can be easily, rapidly and efficiently mixed in the manufacture of bread or cake; and it consists in the features and combinations hereinafter described and claimed.

Figure 1:
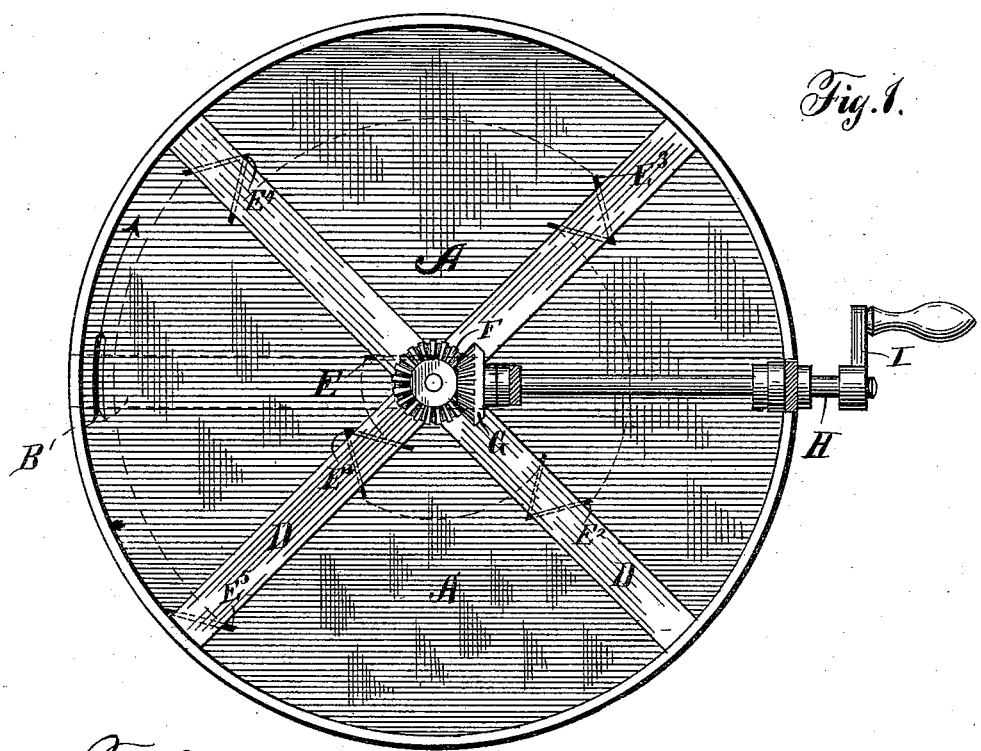
Figure 2:
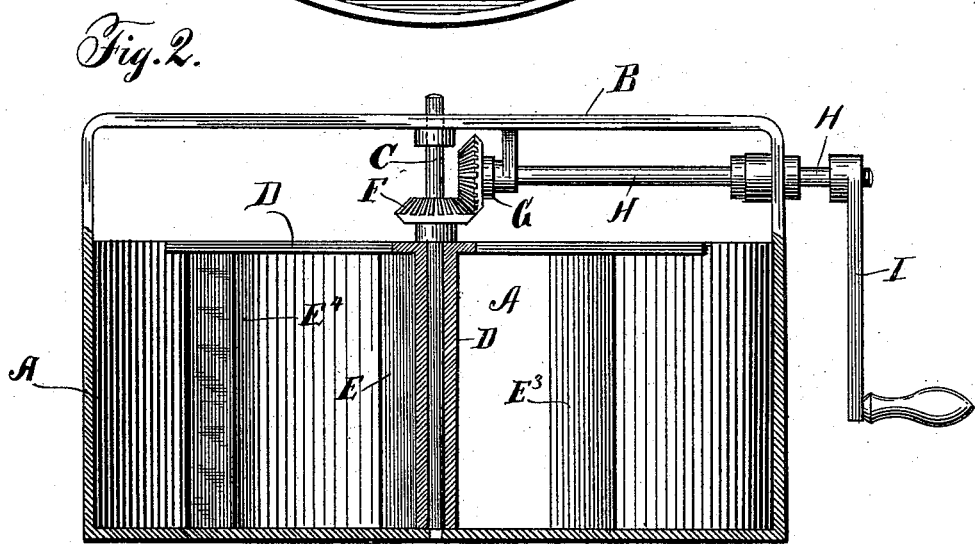

In the drawings Figure 1 is a plan view of my improvement with the bridge for supporting the driving mechanism removed, and Fig. 2 a side elevation partly in section.

In constructing my improved bread mixer I use a receptacle A, preferably circular in shape, and adapted to hold a sufficient quantity of the dough to be mixed. Secured to the receptacle is a bridge B, which supports one end of the upright post C. The other end of the upright post is firmly secured in the bottom of the receptacle. Mounted rotatably on this upright post is a four-armed spider D, to which are secured in any suitable manner the V-shaped mixing blades E, E', $E^2$, $E^3$, $E^4$, and $E^5$ so that by the rotation of the spider the blades are also rotated. It will be noticed by an inspection of Fig. 1 of the drawings that the construction and arrangement of the blades is such that during their rotation when the blade E strikes the mixture it throws the same to one side, and the succeeding blade, E', striking it throws it to both sides of its center so that it can be contacted by the succeeding blade $E^2$. This blade also throws the mixture to both sides of its center in position to be acted on by the next blades in their rotation, and so on until all the blades in their rotation have acted on and stirred the mixture. From this description it will readily be seen that in their rotation the blades cover the entire space in the receptacle from the center of the revolving shaft to the inside surface of the receptacle. In order to rotate the spider and its mixing blades I secure to the upper side of the spider and its hollow shaft a bevel gear F, engaging with another bevel gear G. The bevel gear G is mounted on the shaft H, to which is secured at its outer end a crank I, by which the mechanism can be driven. Of course it will be understood that this crank can be dispensed with and a pulley supplied in its place for driving the mechanism by power or otherwise.

From the foregoing description of construction and operation it will be seen that I have provided an easy, efficient and rapid means for mixing bread or cake dough, and the construction and arrangement of the mixing blades are such that the mass of the mixture to be acted on is readily stirred and mixed by the successive action of these mixing blades. If the blades were placed in radial lines on each of the spider arms so as to cover the entire space in the receptacle during their rotation, rather than to act on the mixture successively, the dough or mixture would not be cut by the rotation of these blades but would be pushed around and rotated, instead of being mixed or stirred.

I have not shown a cover on my receptacle as I do not deem it necessary, but I wish it to be understood that I intend to use a cover on the same.

Although I have entered into a more or less minute description of the details of my invention I wish it to be understood that I do not intend to limit myself unduly to the same, but to vary form and construction of the various parts as circumstances may suggest or render expedient.

I claim—

1. In a dough mixing machine, the combination of a receptacle for holding the dough, blades for stirring and mixing the same located, one after the other, in such relation to each other that the mixture stirred by one is acted on by the adjacent blades, successively, and not simultaneously, arms for supporting the blades, and means for operating the same, substantially as described.

2. In a dough mixing machine, the combination of a receptacle for holding the dough, V-shaped blades for stirring and mixing the same in such manner that the mixture is thrown to either side of the blades in position to be acted on by the succeeding blades in their rotation, arms for supporting the blades, and means for operating the same, substantially as described.

GEORGE W. GREIG.

Witnesses:
EPHRAIM BANNING,
THOS. F. SHERIDAN.